United States Patent [19]

Fujii

[11] 4,350,361

[45] Sep. 21, 1982

[54] LOAD CARRYING PLATFORM FOR A BICYCLE

[76] Inventor: Chiaki Fujii, 6-1 Nishikikui-cho, Nishi-ku, Nagoya-shi, Aichi-ken, Japan

[21] Appl. No.: 185,636

[22] Filed: Sep. 9, 1980

[30] Foreign Application Priority Data

Dec. 6, 1979 [JP] Japan .............................. 54-158433

[51] Int. Cl.³ .............................................. B62J 7/04
[52] U.S. Cl. .............................. 280/289 A; 224/32 A
[58] Field of Search ........................... 280/289 A, 202; 224/32 R, 32 A, 37, 38, 31

[56] References Cited

U.S. PATENT DOCUMENTS 3,572,561  5/1969  McCauley ........................ 224/32 A
3,616,977 11/1971  Zurmuhlen ...................... 224/32 R
4,176,771 12/1979  Dubroc ............................ 280/289 A

FOREIGN PATENT DOCUMENTS 85076    2/1958  Denmark ........................... 224/32 R
51534   12/1941  Netherlands .................... 280/289 A
1037325  7/1966  United Kingdom ........... 280/289 A Primary Examiner—John A. Pekar
Attorney, Agent, or Firm—William A. Drucker

[57] ABSTRACT

A load carrying platform for a bicycle comprises a load carrying platform body for placing a load thereon, leg members for securing the platform body to a bicycle frame and mounting members. The load carrying platform body comprises rigid plate-like transverse members, outer frame members and inner frame members, the leg members having upper ends connected to the transverse members. The upper surface of the transverse member is positioned at a level higher than the outer frame member or inner frame member, and accordingly, the weight of the load placed on the load carrying platform body is applied to the leg members through the transverse members.

4 Claims, 20 Drawing Figures

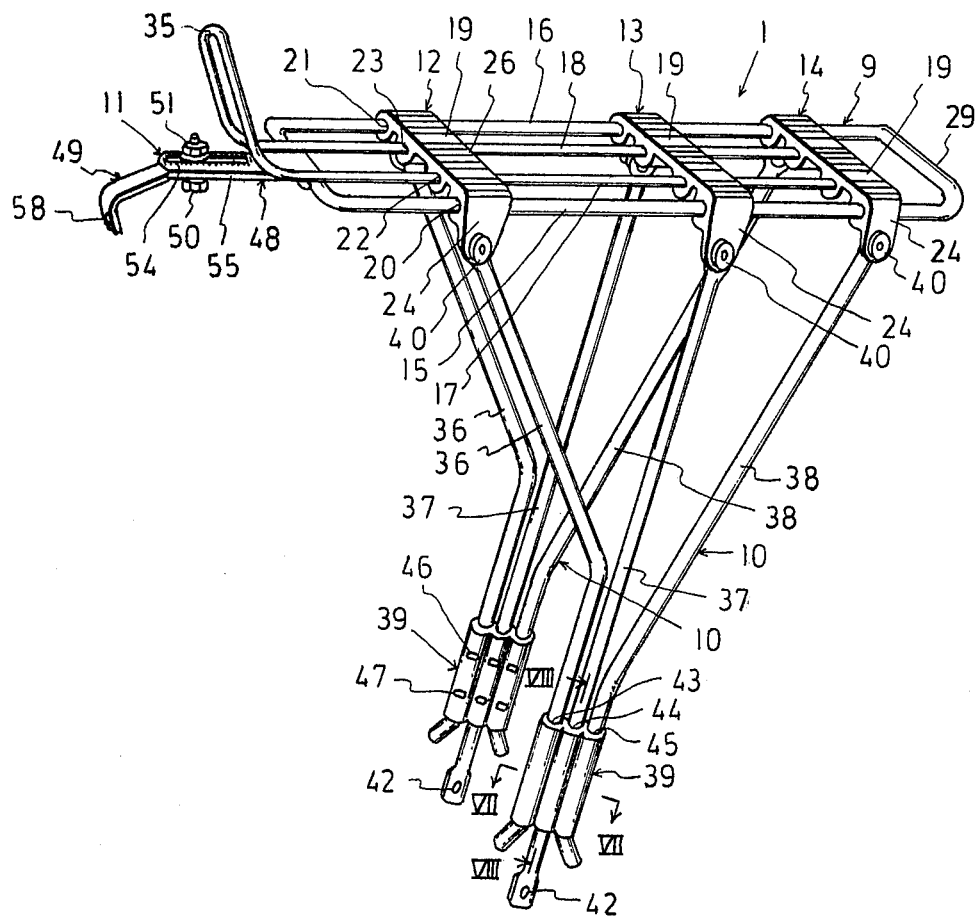
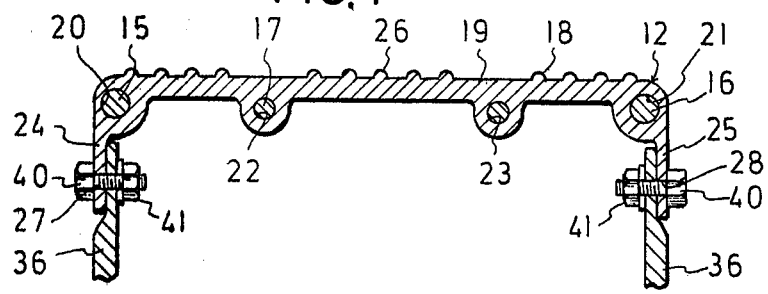
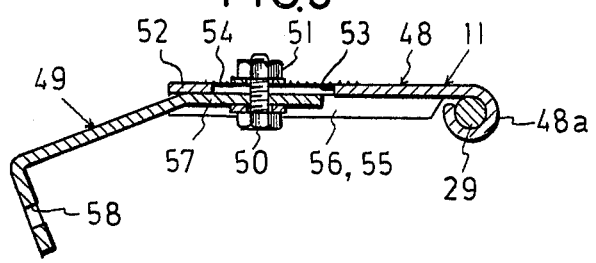

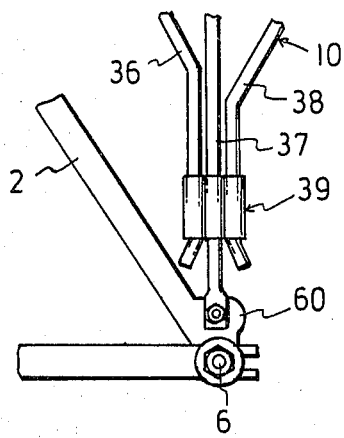
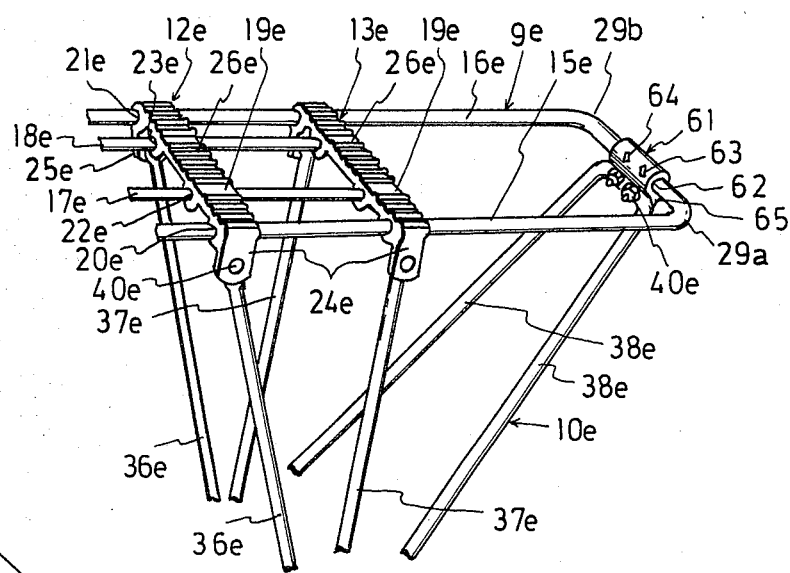
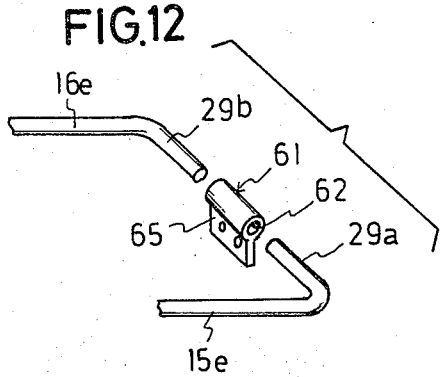
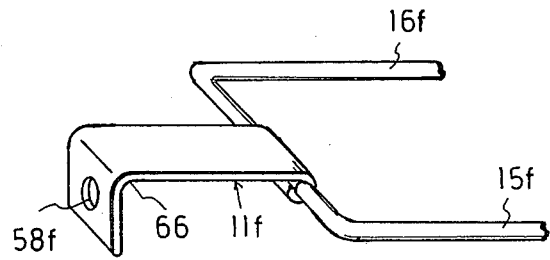

LOAD CARRYING PLATFORM FOR A BICYCLE

BACKGROUND OF THE INVENTION

1. Field of the Invention

The present invention relates to a load carrying platform for a bicycle to be used while being mounted on a frame of the bicycle.

2. Description of the Prior Art

It has been heretofore required to reduce the weight of the bicycle as light as possible. With this requirement, it has been required to reduce the weight of a load carrying platform for a bicycle. In order to meet such requirements, it has been proposed to form members, which form the load carrying platform for a bicycle, from small-diameter rod elements manufactured of light-weighted metal material such as aluminum or aluminum alloys. However, if all the members for the load carrying platform are formed from small-diameter rods, the mechanical strength thereof becomes reduced. For this reason, it has also been proposed that in order to secure necessary and sufficient strength for the load carrying platform, various members for the platform are formed from plates and rods, which are then welded to assemble a load carrying platform. However, welding of plates or rods formed from aluminum or aluminum alloys can only be achieved by use of a very expensive welding device.

SUMMARY OF THE INVENTION

It is an object of the present invention to provide a load carrying platform for a bicycle which can provide a space for carrying a load on the bicycle.

It is a further object of the present invention to provide a load carrying platform for a bicycle which can substantially reduce the whole weight.

It is another object of the present invention to provide a load carrying platform for a bicycle which can offer a smart external appearance.

It is yet another object of the present invention to provide a load carrying platform for a bicycle of such a construction that even if the platform is formed of light-weight material such as aluminum, the mechanical strength may be increased so as to sufficiently withstand the load.

It is still another object of the present invention to provide a load carrying platform for a bicycle of such a construction that even if materials which are totally different in or materials which are hard to weld are used as various constituting members, assembling may be accomplished very simply, that is, various constituting members may be joined one another without use of welding means.

Other objects and advantages of the invention will become apparent during the following discussion of the accompanying drawings.

BRIEF DESCRIPTION OF THE DRAWINGS

FIG. 3 is a perspective view of the load carrying platform;

FIG. 4 is an enlarged sectional view taken along line IV—IV of FIG. 2;

FIG. 5 is an enlarged sectional view taken along line V—V of FIG. 2;

FIG. 10 is a fragmentary view showing a different mode of embodiment in which a lower end of a leg member is mounted on the frame;

FIG. 11 is a perspective view showing a different mode of embodiment of the load carrying platform with a part thereof omitted;

FIG. 12 is an exploded view of a part in FIG. 11; and

FIG. 13 is a perspective view showing a different mode of embodiment showing a mounting member for the load carrying platform for a bicycle.

DESCRIPTION OF THE PREFERRED EMBODIMENTS

Figure 1:
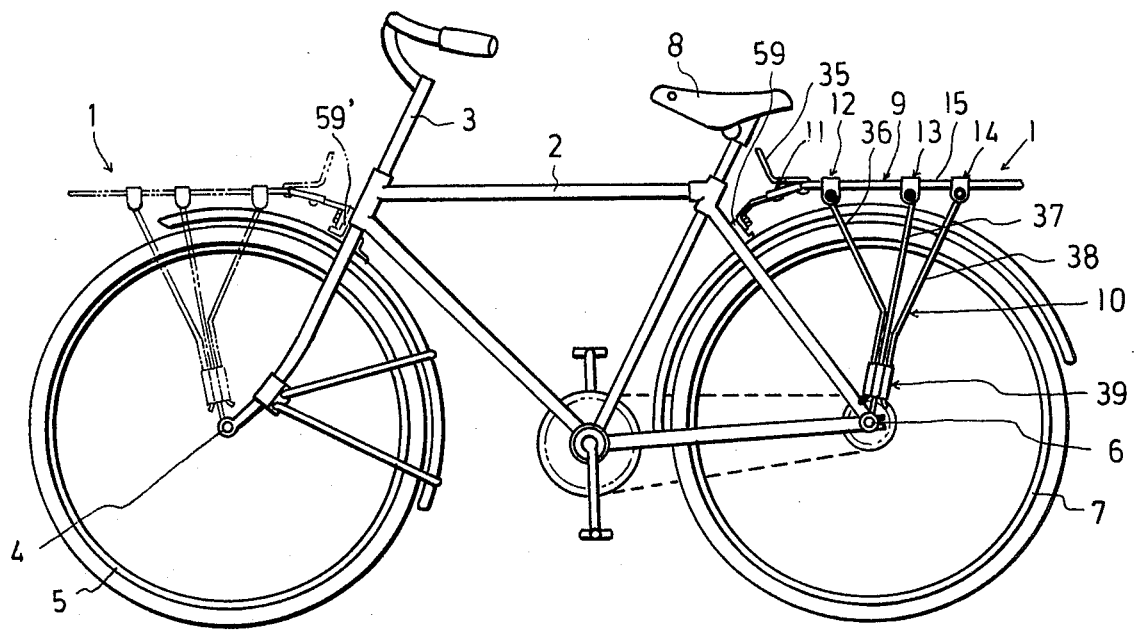
FIG. 1 is a side view schematically showing a bicycle having a load carrying platform mounted thereon.
Figure 2:
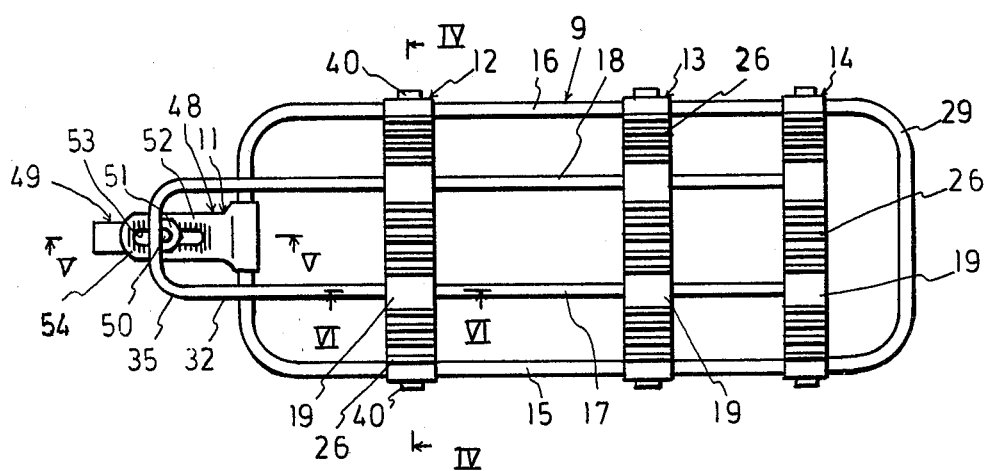
FIG. 2 is a plan view of the load carrying platform for a bicycle.

FIG. 1 illustrates a bicycle provided with a load carrying platform for a bicycle 1 in accordance with the present invention. The bicycle comprises a frame 2, a steering handle shaft 3, a front wheel 5 rotably mounted on the handle shaft 3 by means of a hub shaft 4, a rear wheel 7 rotatably mounted on the frame 2 by means of a hub shaft 6, a saddle 8 mounted on the frame 2 and said load carrying platform 1.

FIGS. 2 to 8 show the aforesaid load carrying platform 1. The load carrying platform 1 comprises a platform body 9 constructed so that a baggage may be laid thereon, a pair of leg members 10, 10 having an upper end connected to the platform body 9 while a lower end is connected to a lower portion of the frame 2 of the bicycle in order that the platform body 9 may be supported, and a mounting member 11 having one end connected to the platform body 9 while the other end is connected to an upper portion of the frame 2 in order that the platform body 9 may be connected to the upper portion of the frame 2. The platform body 9 comprises three transverse members 12, 13, and 14 which are elongated transversely of the bicycle and parallel to one another, two outer frame members 15 and 16 which respectively lie directed in a longitudinal direction of the bicycle and parallel to each other, and two inner frame members 17 and 18 which respectively lie directed in a longitudinal direction and parallel to each other between said outer frame members 15 and 16. The aforementioned transverse members 12, 13 and 14 have the same construction. Therefore, only the transverse member 12 will be described while omitting the explanation of other transverse members 13 and 14. It should be noted that two or more than four transverse members may be employed. The transverse member 12 is molded from a light-weighted metal material such as aluminum. In molding of the transverse member 12, an extrustion of indefinite length is cut at a surface thereof perpendicularly to the drawing direction. Accordingly, the transverse member 12 can be produced in volume at low cost. It should be noted that plastic molding or cast molding may also be employed to produce the transverse members. The transverse member 12 comprises, as shown in FIG. 4, a bearing surface 19 for placing a load thereon formed on the upper surface of the member itself, two insert holes 20 and 21, into which outer frame members are inserted, respectively formed in both left and right ends of said member itself while being directed in a longitudinal direction, two insert holes 22 and 23, into which inner frame members are inserted, formed in inner portions of said member itself while being directed in a longitudinal direction, and connecting pieces 24 and 25 for connecting the leg members extending downwardly on both left and right ends of said transverse member itself. The aforementioned bearing surface 19 is formed with a number of longitudinal raised portions 26 in suitably spaced relation. These raised portions 26 are provided to function as an antiskid surface for a load placed on the bearing surface 19. The aforementioned connecting pieces 24 and 25 are respectively formed with connecting holes 27 and 28.

The above-mentioned outer frame members 15 and 16 comprise left and right parallel straight parts of a U-shaped frame 29 formed by bending a round rod, which is formed of a light-weight metal material such as aluminum, into a U-shape. These outer frame members 15 and 16 are respectively fitted into the holes 20 and 21 of the transverse members 12 and 13 so that said outer frame members 15 and 16 may be slidably moved in a longitudinal direction. Also, the outer frame members 15 and 16 have their front ends inwardly bent so that they may be connected each other to form a front straight part. This front straight part has a portion, which is opposed to the insert holes 22 and 23 of the transverse member 12, formed with recesses 30 and 31 by being downwardly bended by means of a press or the like. (See FIG. 9 (F)) While in the illustrated embodiment, a single round rod is bent into a U-shape to form a U-shaped frame 29, it should be appreciated that ends of two round rods may be bent and the thus bent ends of both round rods can be connected together to form a U-shaped or ]-shaped frame 29.

The above-mentioned inner frame members 17 and 18 comprise left and right straight parts of a U-shaped frame 32 formed by bending a round rod, which is formed of a light-weight metal material such as aluminum, into a U-shape. These inner frame members 17 and 18 also serve as connecting members for connecting the aforementioned transverse members 12, 13 and 14 longitudinally in suitably spaced relation. That is, thes inner frame members 17 and 18 are inserted into the holes 22 and 23 of the transverse members 12, 13, and 14, and a portion 33 of the insert holes 22 and 23, respectively, (the hole 23 not shown) is secured to each of the transverse members 12, 13 and 14 by being collapsed toward the middle frame members 17 and 18. The bent portion of the U-shaped frame 32 is raised obliquely and upwardly to form a rope fastener 35.

Figure 8:
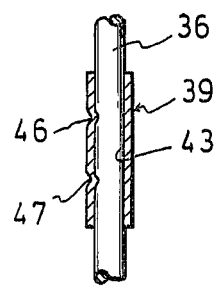
FIG. 8 is an enlarged sectional view taken along line VIII—VIII of FIG. 3.

Next the above-mentioned leg member 10 comprises three leg rods 36, 37 and 38 composed of a round rod formed of a light-weight metal material such as aluminum, and a bundling member 39 for bundling portions near the lower ends of said leg rods 36, 37 and 38 formed of light-weight material such as aluminum. The leg rods 36, 37 and 38 are each connected at their upper end to the connecting piece 24 or 25 on one side of the transverse members 12, 13 and 14 by means of a bolt 40 and a nut 41, the middle leg rod 37 being formed at its lower end with a connecting hole 42 through which said leg rod is connected to the hub shaft 6 of the bicycle. The aforesaid bundling member 39 is formed with three holes 43, 44 and 45. After the leg rods 36, 37 and 38 have been inserted into the holes 43, 44 and 45, respectively, two portions 46 and 47 bounding the member 39 are collapsed toward the leg rods 36, 37 and 38 as shown in FIG. 8 so that each of the leg rods 36, 37 and 38 is secured to the bundling member 39. The lower ends of both outer leg rods 36 and 38 are bent outwardly to completely prevent said leg rods from being slipped off.

Next, the above-mentioned mounting member 11 comprises a mounting base piece 48 formed of a light-weight metal material such as aluminum, a mounting piece 49, and a bolt 50 and a nut 51 for connecting said both elements. The mounting base piece 48 is rotatably mounted on the straight part frontwardly of the U-shaped frame 29 of the platform body 9. The mounting base piece 48 has its overlapped portion 52 formed with a longitudinal adjusting slot 53, said overlapped portion 52 having its upper surface formed with a number of antiskid engaging grooves 54 in a direction perpendicularly to the length of the adjusting slot 53. Guide pieces 55 and 56 are suspended from both edges of the overlapped portion 52. In the mounting piece 49, an overlapped portion 57 on one end thereof is superposed on the back of the overlapped portion 52 of the mounting base piece 48 and is connected to the mounting base piece 48 by means of a bolt 50 and a nut 51 through the adjusting slot 53. The mounting piece 49 is formed at its other end with a mounting hole 58. The mounting piece 49 is mounted on a mounting portion 59 (see FIG. 1) at the upper part of the frame 1 by means of a bolt and a nut through the mounting hole 58.

The body 9 of the load carrying platform 1 having the construction as described above is connected to the hub shaft 6 by means of leg members 10, 10 and connected to the upper portion of the frame 2 by means of the mounting member 11. With this, the platform body 9 is prevented from rotation about the hub shaft 6 so that the load placed on the platform body 9 may be supported. Further, in the platform body 9, both ends of the transverse members 12, 13 and 14 having a relatively great strength are directly supported by the leg members 10, 10, and the outer frame members 15, 16 and inner frame members 17, 18 composed of the round rods 29, 32 having a relatively small strength are positioned at a level lower than the bearing surface 19 . . of the transverse members 12, 13, and 14, and therefore, a load placed on the platform body 9 can be positively supported by the transverse members 12, 13, 14 and leg members 10, 10 having a relatively great strength.

Figure 6:
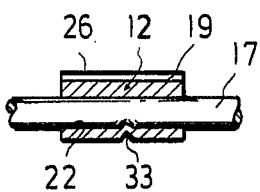
FIG. 6 is an enlarged sectional view taken along line VI—VI of FIG. 2.
Figure 7:
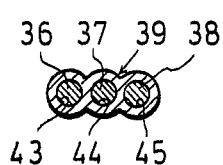
FIG. 7 is an enlarged sectional view taken along line VII—VII of FIG. 3.
Figure 9:
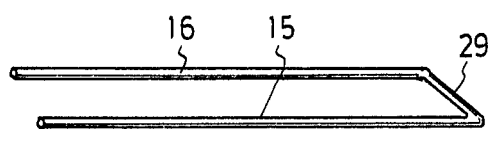
FIGS. 9 (A)-9 (H) are respectively views for explanation of the assembling order of the load carrying platform.
Figure 9:
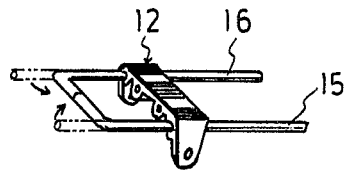
Figure 9:
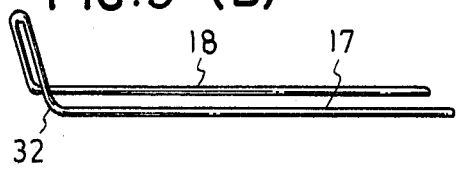
Figure 9:
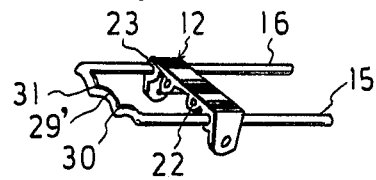
Figure 9:
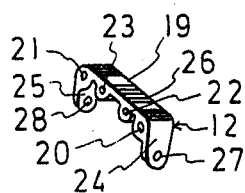
Figure 9:
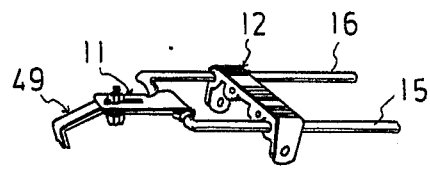
Figure 9:
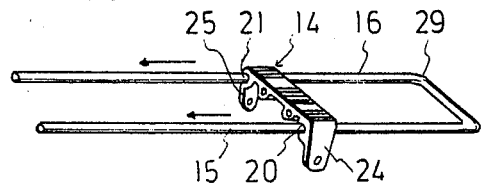
Figure 9:
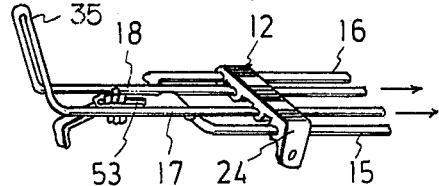

Next, in the manufacture of the load carrying platform for a bicycle 1 of the construction as described above, the transverse members 12, 13 and 14 of the load carrying body 9 and the bundling members 39, 39 of the leg members 10, 10 as shown in FIG. 9 (C) are molded in a light-weight metal material such as aluminum. In assembling of the platform, a round rod is first bent into a U-shape rod to form the aforementioned U-shaped frame 29 as shown in FIG. 9 (A). Next, the outer frame members 15, 16 are successively inserted into the insert holes 20, 21 of the transverse members 14, 13, 12 from the rear as shown in FIG. 9 (D). Thereafter, the forward ends of the outer frame members 15, 16 are bent inwardly towards each other to form a front straight part as shown in FIG. 9 (E). Then, the front straight part is formed by a press or the like with two recesses 30, 31 opposed to the holes 22, 23 in the midst of the transverse members 12, 13 and 14. Next, the mounting member 11 is mounted as shown in FIG. 9 (G). This mounting can be done by winding an end 48a of the mounting base piece 48 preformed into a plate about a butted portion 29' at the tip of the U-shaped frame 29. On the other hand, a further round rod is bent into a U-shaped configuration to form a U-shaped frame 32 as shown in FIG. 9 (B). Next, the U-shaped frame 32 is inserted from the front into the holes 22, 23 in the midst of the transverse members 12, 13 and 14 through the recesses 30, 31 as shown in FIG. 9 (H), after which a part 33 of the transverse member is collapsed as shown in FIG. 6 so that the middle frame members 17, 18 and transverse members 12, 13, 14 are made integral each other. Thus, the platform body 9 can be completed.

On the other hand, the lower ends of the leg rods 36, 37 and 38 are inserted into the holes 43, 44 and 45 of the bundling member 39, after which parts 46, 47 of the bundling member 39 are deformed as shown in FIG. 8 so that the leg rods 36, 37, 38 and bundling member 29 are made integral each other. Thereafter, the lower end of the middle leg rod 37 is machined into a flat portion, which is provided with a connecting hole 42. The lower ends of both outer leg rods 36 and 38 are bent outwardly. This completes the leg member 10. Two of the leg member 10 are manufactured. Next, the upper ends of the leg rods 36, 37 and 38 in the leg member 10 are connected to the connecting piece 24 or 25 of the transverse members 12, 13 and 14 by means of the bolt 40 and nut 41. In this manner, the assembly of the load carrying platform for a bicycle 1 may be completed without use of welding means.

Next, in mounting the load carrying platform 1 on the bicycle, the lower end of the leg rod 37 of the leg member 10 is first mounted on the hub shaft 6 of the bicycle (after the nut of the hub shaft 6 is loosened). Also, the mounting hole 58 of the mounting piece 49 is connected to the mounting portion 59 at the upper part of the frame 2 of the bicycle with the nut 51 of the mounting member 11 loosened. Thereafter, the platform body 9 is slightly moved longitudinally with respect to the bicycle so that the bearing surfaces 19 . . . of the platform body 9 may assume substantially a horizontal level, and in this condition, the nut 51 of the mounting member 11 is fastened so that the mounting base piece 48 and mounting piece 49 are made integral each other, and the nut of the hub shaft 6 is fastened. This completes mounting of the platform 1 on the bicycle. It should be noted that if the aforementioned load carrying platform 1 is mounted on another bicycle which is different in distance between the hub shaft 6 and mounting portion 59 (such as the case where the size of the wheels is different as in 26, 27 and 28 inches), the platform 1 may be mounted on the bicycle in a manner similar to the former by longitudinally moving the outer frame members 15, 16 with respect to the transverse members 12, 13 and 14 or by mutually displacing the mounting base piece 48 and mounting piece along the slot 53. Subsequently there is no need for movement of the outer frame members 15 and 16 with respect to the transverse members 12, 13 and 14. Upon completion of mounting as described above, they may be fixed by suitable fixing means, for example, such as adhesives, screws, and mechanical deformation (collapse) of a part of the wall of the holes 20, 21 to prevent arbitrary movement thereof during use of the bicycle.

The lower end of the leg rod 10 may be fastened to a mounting plate 60 disposed in the vicinity of the hub shaft 6 at the lower part of the frame 2 as shown in FIG. 10.

Furthermore, it will be noted that the load carrying platform may be arranged not only at a position upwardly of the rear wheel 7 but at a position upwardly of the front wheel 5. Also, in this case, equally to the foregoing, that is, the lower end of the leg rod 37 is fastened to the hub shaft 4 or to a portion in the neighbourhood thereof, and the mounting piece 49 fastened to a mounting portion 59' in the midst of the handle shaft 3, as shown by dash-dotted contour lines of FIG. 1.

Next, FIGS. 11 and 12 show another embodiments of the present invention. In this embodiment, a load carrying platform body 9e comprises two transverse members 12e and 13e, two outer frame members 15e and 16e, and two inner frame members 17e and 18e. Two outer frame members 15e and 16e comprises two outer frame elements 29a and 29b. In these outer frame elements 29a, 29b, rear ends thereof are inwardly bended through 90 degrees, and these ends are respectively inserted from both sides into the hole 62 of the connecting member 61, after which two portions 63 and 64 of the member 61 are collapsed toward the ends of the outer frame elements 29a and 29b in a manner similar to that of the portions 33, 46 and 47 as described above so that rear ends of the two outer frame elements 29a and 29b may be connected integrally. Further, upper ends of leg rods 36e, 37e and 38e of a leg member 10e are respectively connected to connecting pieces 24e, 24e or 25e, 25e of the transverse members 12e, 13e and a connecting piece 65 of the connecting member 61.

Parts which are the same or equal in fuction to those shown in the preceding drawings bear the same reference numerals as those used therein with an alphabet 'e' affixed thereto for omission of duplicate explanation. (Also in the device shown in FIG. 13, a letter 'f' is affixed to corresponding parts for omission of explanation.)

Finally, FIG. 13 shows a different embodiment of the mounting member in accordance with the present invention. This mounting member 11f comprises an L-shaped piece 66 having one end rotatably mounted on the straight part frontwardly of a round rod 29f and the other end bent through approximately 90 degrees. A bent piece of the L-shaped piece 66 is formed with a mounting hole 58f.

What is claimed is:

1. A load carrying platform for a bicycle comprising:
   (i) a platform body to support a load placed thereon,
   (ii) a pair of leg members for supporting said platform body, said leg members having an upper end connected to said platform body and a lower end for connection to a bicycle frame,
   (iii) a mounting member having a first end connected to said platform body and a second end for connecting to said bicycle frame,
   said platform body comprising a plurality of transverse members which are elongated transversely of the platform and are spaced parallel to each other longitudinally of the platform and which have engaged therethrough a pair of rod-like outer frame members and a plurality of rod-like inner frame members, each transverse member having an upper load bearing surface and including longitudinally-disposed holes at each end receiving said outer frame members and a plurality of longitudinally-disposed holes in a central portion thereof receiving said inner frame members, said holes being disposed at a level below that of said bearing surface, each outer frame member and inner frame member being secured in position in its hole by a portion of the transverse member deformed towards the outer or inner frame member respectively, said transverse members further including at each end thereof a connecting place to which a respective one of said leg members is secured, said outer frame members being respective straight parallel arms of an outer frame and having respective inturned forward ends aligned with each other, said inner frame members being respective straight parallel arms of an inner frame connected by a forward upwardly-inclined curved portion to serve as a rope fastener.

2. A load carrying platform for a bicycle, according to claim 1, wherein the number of said transverse members is three and they are each formed at an upper surface with raised anti-skid portions to support the load, and wherein said leg members each comprise three leg rods and a bundling member integrally connecting lower portions of said leg rods, said leg rods each having their upper end individually connected to a connecting piece of a transverse member, a central one of said leg rods having a lower end formed with a connecting portion for connecting to the bicycle frame.

3. A load carrying platform for a bicycle, according to claim 1 or claim 2, wherein said mounting member comprises a base piece having a rear end rotatably connected to said inturned forward ends, and a mounting piece longitudinally adjustably connected to said base piece, said mounting piece having at a front end thereof a mounting portion for connection to the bicycle frame.

4. A load carrying platform, as claimed in claim 1, wherein said transverse members are portions cut transversely from an extrusion of aluminum material.

* * * * *